United States Patent [19]
Fujieda et al.

[11] Patent Number: 5,550,659
[45] Date of Patent: Aug. 27, 1996

[54] ACTIVE MATRIX LIQUID CRYSTAL DISPLAY HAVING A SPATIAL COORDINATES INPUT FUNCTION

[75] Inventors: Ichiro Fujieda; Setsuo Kaneko, both of Tokyo, Japan

[73] Assignee: NEC Corporation, Tokyo, Japan

[21] Appl. No.: 280,332

[22] Filed: Jul. 25, 1994

[30] Foreign Application Priority Data

Jul. 26, 1993 [JP] Japan ................................ 5-183774

[51] Int. Cl.$^6$ ................................ G02F 1/1335
[52] U.S. Cl. ................................ 359/54; 345/104
[58] Field of Search .............. 359/54, 51; 345/104

[56] References Cited

U.S. PATENT DOCUMENTS

| | | | |
|---|---|---|---|
| 4,679,909 | 7/1987 | Hamada et al. | 345/104 |
| 4,785,564 | 11/1988 | Gurtler | 40/448 |
| 4,841,290 | 6/1989 | Nakano et al. | 340/707 |
| 5,151,688 | 9/1992 | Tanaka et al. | 340/707 |
| 5,194,852 | 3/1993 | More et al. | 340/712 |
| 5,410,329 | 4/1995 | Tagawa et al. | 345/104 |

FOREIGN PATENT DOCUMENTS

| | | | |
|---|---|---|---|
| 2652185 | 3/1991 | France | 345/104 |
| 54-24597 | 2/1979 | Japan | 359/54 |
| 4-343387 | 11/1992 | Japan . | |

*Primary Examiner*—William L. Sikes
*Assistant Examiner*—Charles Miller
*Attorney, Agent, or Firm*—Popham, Haik, Schnobrich & Kaufman, Ltd.

[57] ABSTRACT

A liquid crystal layer is disposed between a member including a transparent substrate on which pixel electrodes, TFTs, scan lines, and data lines are formed and a member including another transparent substrate over which there are formed two sets of stripe-shaped electrodes to be vertical to each other with an insulating layer inserted therebetween and a uniform transparent conductive layer as an opposing electrode over the stripe-shaped electrodes with an insulating layer inserted therebetween. The stripe-shaped electrodes are arranged, when viewed from above, to occupy gap areas between the pixel electrodes. Sequentially applying voltage pulses to the electrodes beginning at an end portion thereof, a pen input function is achieved according to the electrostatic capacitive-coupling scheme. An active matrix liquid crystal display (AMLCD) having a pen input function is thus obtained at a low cost without deteriorating the display performance.

5 Claims, 5 Drawing Sheets

ACTIVE MATRIX LIQUID CRYSTAL DISPLAY HAVING A SPATIAL COORDINATES INPUT FUNCTION

BACKGROUND OF THE INVENTION

The present invention relates to a matrix liquid crystal display for displaying information having a function to input spatial coordinates by use of electrostatic capacitive coupling, and in particular, to an active matrix liquid crystal display having a configuration of electrodes in a display panel in which each pixel has a switching element, the potential of each electrode being externally controlled to supply electric charge to spatial coordinates input means.

DESCRIPTION OF THE PRIOR ART

As for the conventional liquid crystal displays having therein a spatial coordinates input function, there has been Known a technology associated with a simple matrix liquid crystal display in which switch means is not disposed for each pixel. In the following paragraphs, the spatial coordinates input function will be referred to as a pen input function and means for achieving the function will be referred to as a pen.

FIG. 1 shows in a perspective view an example of a conventional simple matrix Liquid crystal display possessing a pen input function. The configuration includes two members each including an insulating substrate 210 on which stripe-shaped electrodes 215 are formed with a transparent conductive substance such as ITO. These members are arranged such that longitudinal directions of the two sets of electrodes 215 are vertical to each other. Between these members, there is disposed a liquid crystal layer having a thickness of about several micrometers. In operation, when a pen 201 having a function to sense electric charge is placed near a position of the system, the spatial coordinates of the pen position are sensed according to the capacitive coupling between the pen 201 and the electrodes 215. In the constitution, each electrode 215 has an end connected to, a driver circuit outside the display area so that the potential of each electrode 215 is controlled independently.

Next description will be given of operation of the liquid crystal display. FIG. 2 is a diagram useful to explain the principle of sensing the pen position, namely, spatial coordinates of the pen according to the capacitive coupling. As can be seen from FIG. 2, a pen 201 including an amplifier 204 and a tip 203 for sensing electric charge and to amplify a signal associated therewith is moved toward a position on an insulation substrate 210 from a position thereabove. In this state, when a voltage pulse is sequentially applied to one of the sets of electrodes 215 arranged to re vertical to each other, the pen 201 accordingly senses the electric charge proportional to an electrostatic capacitance 202 between each of the related electrodes 215 and the pen 201. Based on points of time of appearances; of the detected signals, it is possible to obtain the coordinate value of the pen position in a direction vertical to the electrode. Substantially the same operation is accomplished for the othere one of the sets of electrodes 215 to attain the coordinate value of the pen position in the remaining dimension. According to the results of these operations, there can be attained values of two-dimensional coordinates of the pen position. In addition, since the magnitude of each of the signals is proportional to the static capacity between the pen 201 and the related electrode 215, the height of the pen 201 relative to the display surface can be determined according to the magnitude.

Furthermore, in the constitution of FIG. 1, since the electrodes 215 have also a function to apply a voltage to the liquid crystal, it is required to prevent the voltage change of each of the electrodes 215 due to the pen input operation from exerting influences upon the display operation of the liquid crystal. To this end, a period of time to display an image, namely, one frame period is subdivided into two portions including a liquid crystal display period for an ordinary operation to drive the liquid crystal and a pen input period to sense the coordinates of the pen 201. As for the length in time, the liquid crystal display period is set to be about 20 times that of the pen input period. According to the driving scheme, the user can conduct an operation to input pen coordinates for each frame.

The principle of the pen input operation above has been generally known as an electrostatic capacitive-coupling method. This method is also applicable to a liquid crystal display of a pen input integrated type or a hybrid type including a pen input function in which two sets of stripe-shaped electrodes are formed to be vertical to each other respectively on separate substrates and are thereafter fixedly disposed on a surface of the display.

Moreover, as an active matrix liquid crystal display (to be abbreviated as AMLCD herebelow) having switching means for each pixel and a pen input function integrated therein, there has been a display as described, for example, in the JP-A-4-343387 in which a light sensing element is disposed for each pixel so that the user operates a light pen to input coordinates thereof to the system.

FIG. 3 shows the circuit configuration of a pixel of the conventional AMLCD having a pen input function. In the ordinary AMLCD, a pixel 100 includes such components as switching elements 103, for example, thin film field effect transistors (TFTs), a liquid crystal display element 102 having a liquid crystal element 106, a row address conductor 104 and column address conductor 105 to feed signals thereto, and a light sensing element 101 for enabling a light pen input operation.

In this regard, the light sensing element 101 includes a photoelectric element 107, a charge accumulating element 108, and a switching element 103 for deciding addresses of these elements.

When a light is irradiated onto the photoelectric element 107, there occurs a change in the voltage developed across the ends of the charge accumulating element 108 according to the intensity of illumination, thereby storing optical information in each pixel as a result. Through an operation to sequentially read optical information from the pixels, it is possible to decide the pixels illuminated by the light pen, namely, the spatial coordinates of the pen.

However, the simple matrix crystal display above has a picture quality which is inferior to that of the active matrix crystal display (AMLCD).

Moreover, in an AMLCD having a light sensing element for each pixel, the area dedicated to presentation of an image is minimized by the areas occupied by the light sensing elements, which hence lowers the brightness of display. In addition, the AMLCD requires a complex process of manufacturing pixels and hence lowers the production yield.

SUMMARY OF THE INVENTION

It is therefore an object of the present invention to provide a low-cost AMLCD having a pen input function without sacrificing the display performance, thereby solving the problems discussed above.

In order to achieve the object above, in accordance with the present invention, there is provided an active matrix liquid crystal display including a substrate on an active element side including an insulating substrate, switching elements, pixel electrodes, and scan lines and data lines for writing data in the pixels, the switching elements, the pixel electrodes, and the scan and data lines being formed on the insulating substrate; an insulating substrate on an opposing electrode side including a transparent conductive layer; a liquid crystal layer enclosed between the substrate on the active element side and the insulating substrate on the opposing electrode side; two sets of a multiplicity of electrodes formed to be vertical to each other on the insulating substrate on the opposing electrode side with an insulating layer inserted between the electrodes and the substrate on the opposing side; means for externally controlling potential of each of the plural electrodes in an independent manner; and means for sensing electric charge.

Moreover, in accordance with the present invention, there is provided an active matrix liquid crystal display including a substrate on an active element side including an insulating substrate, switching elements, pixel electrodes, and scan lines and data lines for writing data in the pixels, the switching elements, the pixel electrodes, and the scan and data lines being formed on the insulating substrate; an insulating substrate on an opposing electrode side including a transparent conductive layer; a liquid crystal layer enclosed between the substrate on the active element side and the insulating substrate on the opposing electrode side; a multiplicity of electrodes formed between the insulating substrate of the substrate on the active element side and the pixel electrodes with an insulating layer inserted between the plural electrodes and the pixel electrodes; means for externally controlling potential of each of the plural electrodes in an independent manner; and means for sensing electric charge.

In addition, in accordance with the present invention there is provided an active matrix liquid crystal display in a non-crossover bus (NOB) configuration including a substrate on an active element side including an insulating substrate, switching elements, pixel electrodes, scan lines, and metal lines for receiving a reference voltage, the switching elements, the pixel electrodes, the scan lines, and metal lines being formed on the insulating substrate; a substrate on an opposing electrode side including an insulating substrate and data lines for writing data in the pixels, the data lines being formed on the insulating substrate; a liquid crystal layer enclosed between the substrate on the active element side and the insulating substrate on the opposing electrode side; a multiplicity of band-shaped electrodes formed to be vertical to the data lines between the insulating substrate of the substrate on the opposing electrode side and the data lines with an insulating layer inserted between the plural electrodes and the data lines; means for externally controlling potential of each of the band-shaped electrodes in an independent manner; and means for sensing electric charge.

The AMLCD integrally having a pen input function in accordance with the present invention includes two sets of band-shaped electrodes arranged vertical to each other for enabling a pen input scheme utilizing electrostatic capacitive-coupling or means developing the same function. According to an aspect of the present invention, the electrodes also have function of either one of such constituent elements of the conventional AMLCD as the black matrix, the opposing electrode, the charge storage electrodes, and the signal write electrodes.

In the AMLCD having an integral pen input function of this type, the pen input function can be added to the AMLCD without deteriorating performance of the crystal liquid display. Moreover, the electrode means for the pen input scheme also develops a function of the pertinent constituent elements of the AMLCD, and hence the production cost thereof can be reduced.

BRIEF DESCRIPTION OF THE DRAWINGS

The objects and features of the present invention will become more apparent from the consideration of the following detailed description taken in conjunction with the accompanying drawings wherein.

DESCRIPTION OF THE PREFERRED EMBODIMENTS

Referring now the to drawings, description will be given of an embodiment of an AMLCD having an integral pen input function in accordance with the present invention.

Figure 1:
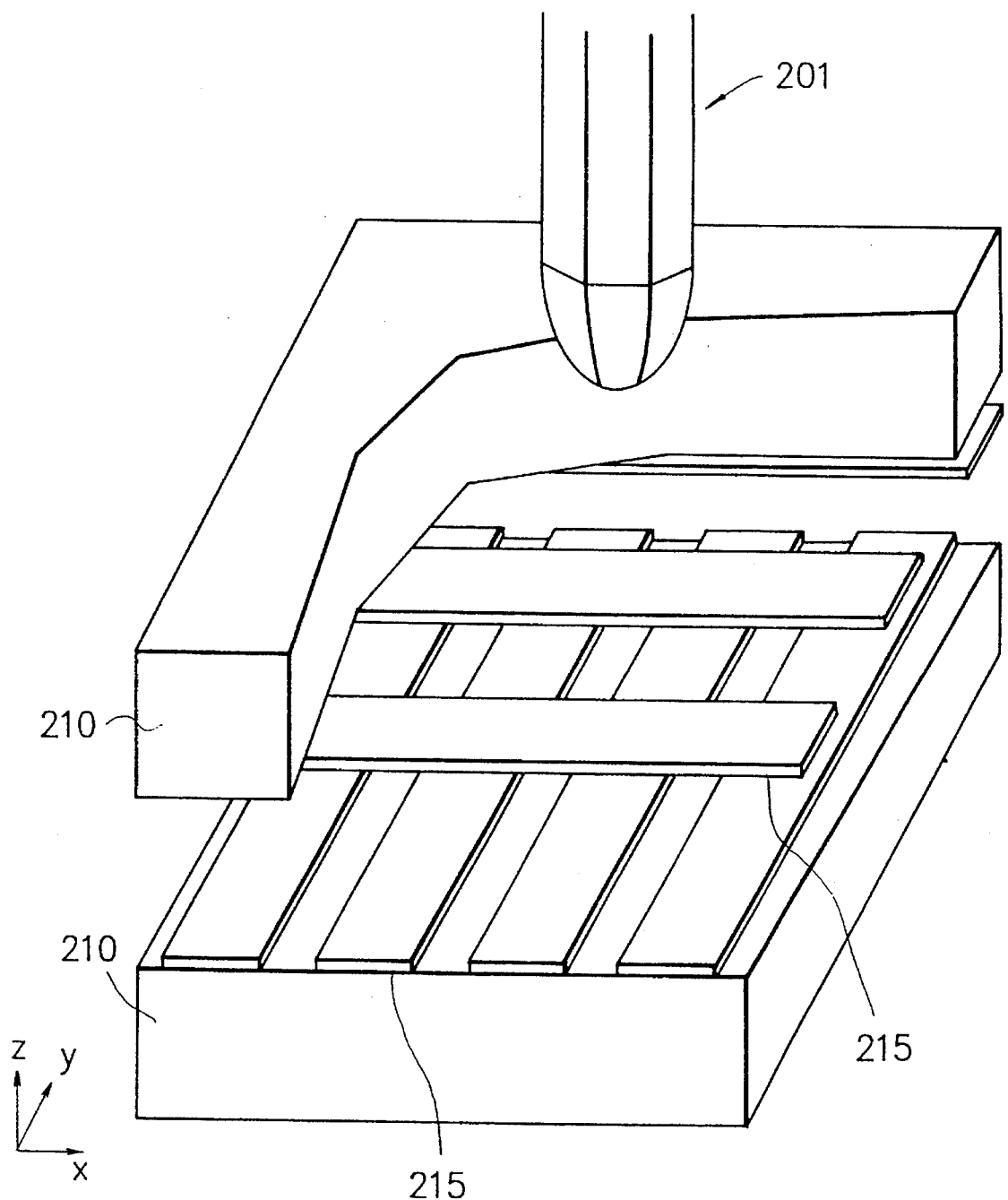
FIG. 1 is a schematic perspective view showing a conventional example of the simple matrix liquid crystal display including a pen input function.
Figure 2:
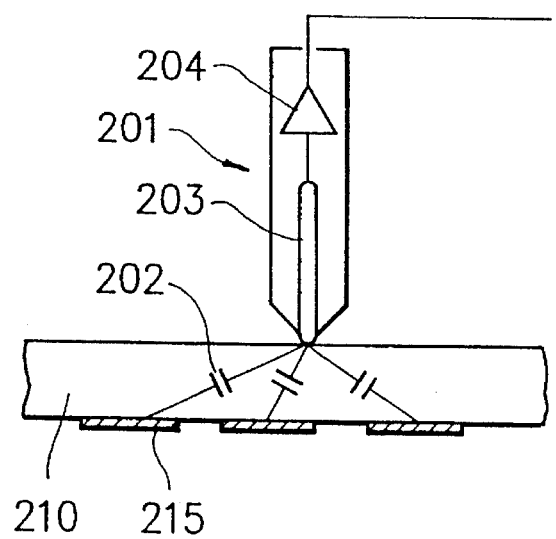
FIG. 2 is a diagram for explaining the principle of the conventional pen input operation according to the capacitive coupling.
Figure 3:
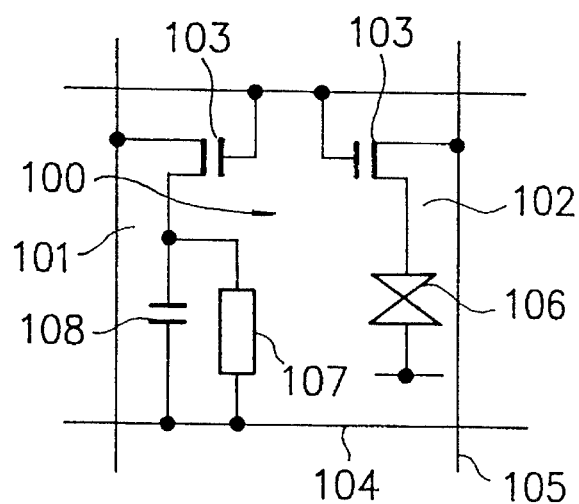
FIG. 3 is a circuit diagram schematically showing a conventional example of the simple matrix liquid crystal display including a pen input function.
Figure 4:
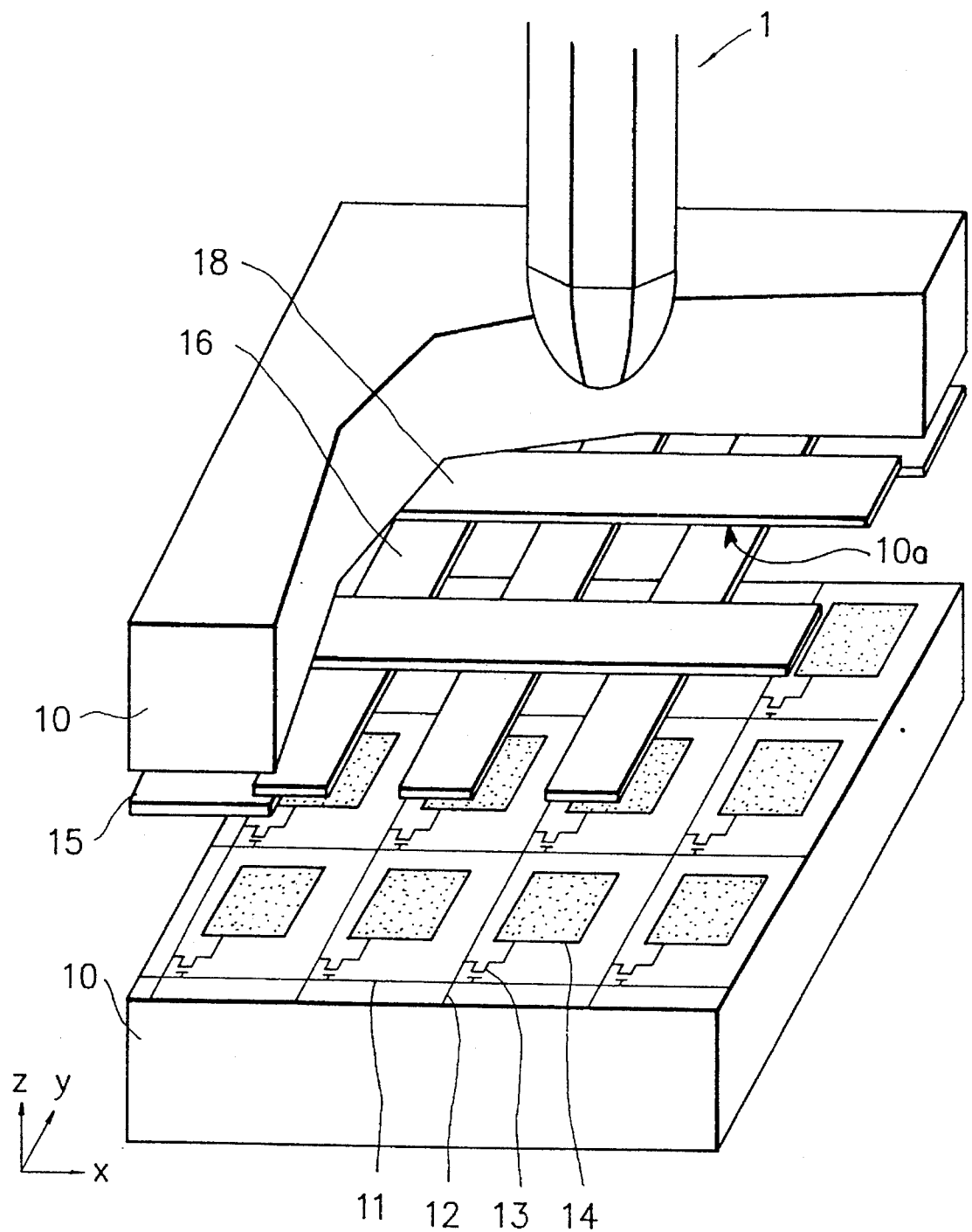
FIG. 4 is a perspective view schematically showing an active matrix liquid crystal display (AMLCD) having an integral pen input function in a first embodiment in accordance with the present invention.

FIG. 4 shows in a perspective view a first embodiment of an AMLCD in accordance with the present invention. The AMLCD includes an upper member, a lower member, and a liquid crystal layer enclosed therebetween, the layer having a thickness of several micrometers. As shown in this diagram, the lower member includes an insulating substrate 10 and pixel electrodes 14, thin film transistors (TFTs) 13, scan lines 11, and data lines 12, these constituent elements being formed on the substrate 10. The upper member includes another insulating substrate 10 and two sets of band-shaped electrodes 16 and 18 formed to be vertical to each other over the substrate 10 with an insulation layer 10a therebetween. Moreover, a uniform transparent conductive layer is disposed as an opposing electrode 15 under the plurality of electrodes 16, 18 with an insulation film therebetween.

The electrodes 16 and 18 are fabricated with such a material as a metal including aluminum, chromium, or the like. Each electrode has a thickness not allowing lights to pass therethrough. Furthermore, locations of the electrodes 16 and 18 are decided such that the electrodes occupy the gap zones between the pixel electrodes 14 when viewed from above or in the plan view.

In general, in a normally white transparent AMLCD in which a black portion of an image is satisfactorily displayed, to remove lights passing through gaps between the pixel electrodes and to prevent lights from being irradiated onto the TFTs 13, a meshed light absorbing member (namely, a black matrix) is arranged between the opposing electrode 15 and the insulating substrate 10. In the structure of FIG. 4, the light inhibiting electrodes 16 and 18 adopted for the pen input operation achieve the function of the black matrix.

Description will next be given of operation of the first embodiment. To realize the pen input function according to the capacitive coupling, voltage pulses are sequentially applied to the electrodes 16 and 18 beginning at an end portion thereof. The liquid crystal layer is electrically shielded by the opposing electrode 15 so that liquid crystal layer is not influenced by potential changes of these electrodes 16 and 18. In consequence, the pen input operation and the liquid crystal display operation can be independently driven. That is, it is possible to input a plurality of pen coordinates while displaying an image. Consequently, the operation can be achieved in association with a high-speed movement of the pen.

In accordance with the present invention, there is obtained a second embodiment of the AMLCD by modifying the first embodiment of FIG. 4 as follows. The opposing electrode 15 is removed and the electrodes 16 and 18 are fabricated as transparent conductive films with ITO or the like such that the electrodes 16 are arranged, when viewed from above, to occupy the areas of the (pixel) electrodes (14).

Subsequently, operation of the second embodiment will be described. Like in the first embodiment, to activate the pen input function, voltage pulses are similarly applied to the electrodes 16 and 18. However, in this example, the electrodes 16 also conduct the function as the opposing electrode of the AMLCD. Consequently, there is adopted a system driving method in which the pen input operation does not exert influences upon the liquid crystal display. Namely, the display period of one image is divided into two partitions including a liquid crystal display period and a pen coordinate sense period such that the former is sufficiently longer in time than the latter. For each frame, it is possible to input coordinates of only one pen position. The constitution of this example is efficiently applicable to, for example, a reflective AMLCD for which the black matrix is not necessary.

Figure 5:
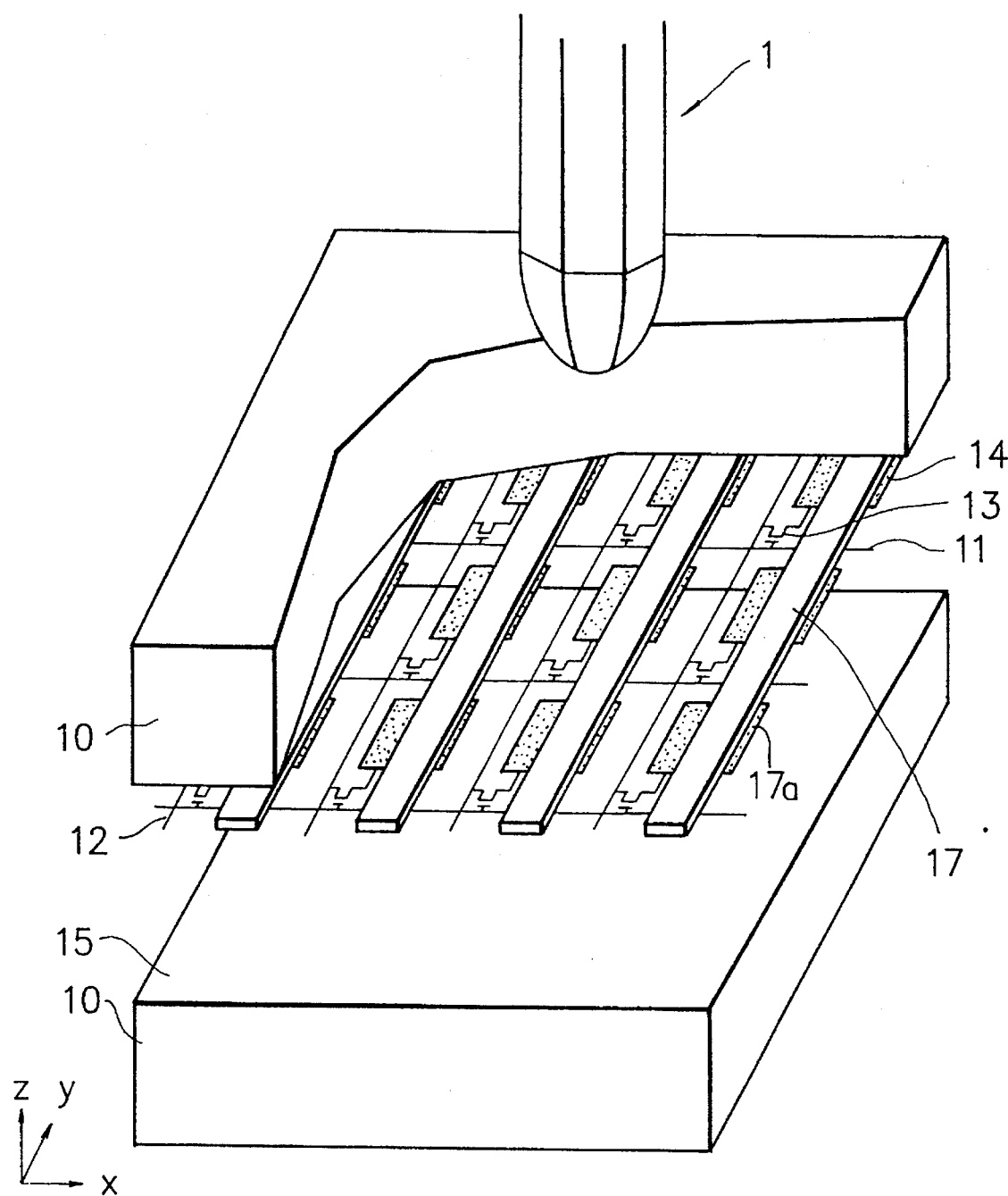
FIG. 5 is a schematic perspective view showing an active matrix liquid crystal display (AMLCD) having an integral pen input function in a third embodiment in accordance with the present invention.

FIG. 5 shows in a perspective view a third embodiment of the liquid crystal display in accordance with the present invention. In this configuration, a substrate including such elements as pixel electrodes 14 and TFTs 13 is arranged on a side where the pen is manipulated. Between the pixel electrodes 14 and an insulating substrate 10, a plurality of band-shaped electrodes 17 formed with a transparent conductive substance such as ITO are disposed in a direction vertical to a scanning line 11 with an insulation layer 17a inserted between the pixel electrodes 14 and the electrodes 17. The electrodes 17 are arranged, when viewed from above, to occupy only a portion of the areas of the pixel electrodes 14. Each of the areas enclosed with the electrodes 17 and the pixel electrodes 14 configures an electrostatic capacitance (storage capacitance) to be additionally arranged to improve a characteristic of the pixel to keep charges therein. Namely, the electrodes 17 also serve to develop the storage capacitance.

Next, description will be given of operation of the third embodiment of the liquid crystal display in accordance with the present invention. In response to voltage pulses sequentially applied to the electrodes 17 beginning at the end portion thereof, a coordinate value of the pen 1 with respect to the x axis is sensed according to the principle of the electrostatic capacitive-coupling scheme described above. To sense a coordinate value of the pen 1 with respect to the y axis, there is used variation in the potential of the pixel electrodes 14. Namely, with the same data written in all data lines 12, when a display operation is achieved by the display (for example, to present a black screen image), the potential of each pixel electrode 14 addressed by the associated scan line 11 is changed. On the side of the pen 1, the potential variation of each of the pixel electrodes 14 is partially shielded by the electrodes 17. However, a portion thereof can still be observed on the pen side. In consequence, when viewed from the pen 1, the plural pixel electrodes 14 addressed by the same scan line 11 can be regarded as an electrode having a band contour. At a point of time immediately thereafter, there occurs a potential change in pixel electrodes addressed by a subsequent scan line. This is equivalent to an operation in which voltage pulses are sequentially applied to the stripe-shaped electrodes, thereby sensing the y-axis coordinate of the pen 1 according to the above principle.

In the construction, the potential variation of each pixel electrode 14 is utilized to achieve the pen input operation. Consequently, to effect the input operation without exerting influences upon the liquid crystal display, it is necessary to split a display period of one image into two portions including a liquid crystal display period and a pen coordinate sense period, the former being satisfactorily longer in time than the latter. In consequence, it is possible to input coordinates of only one pen position for each frame.

Figure 6:
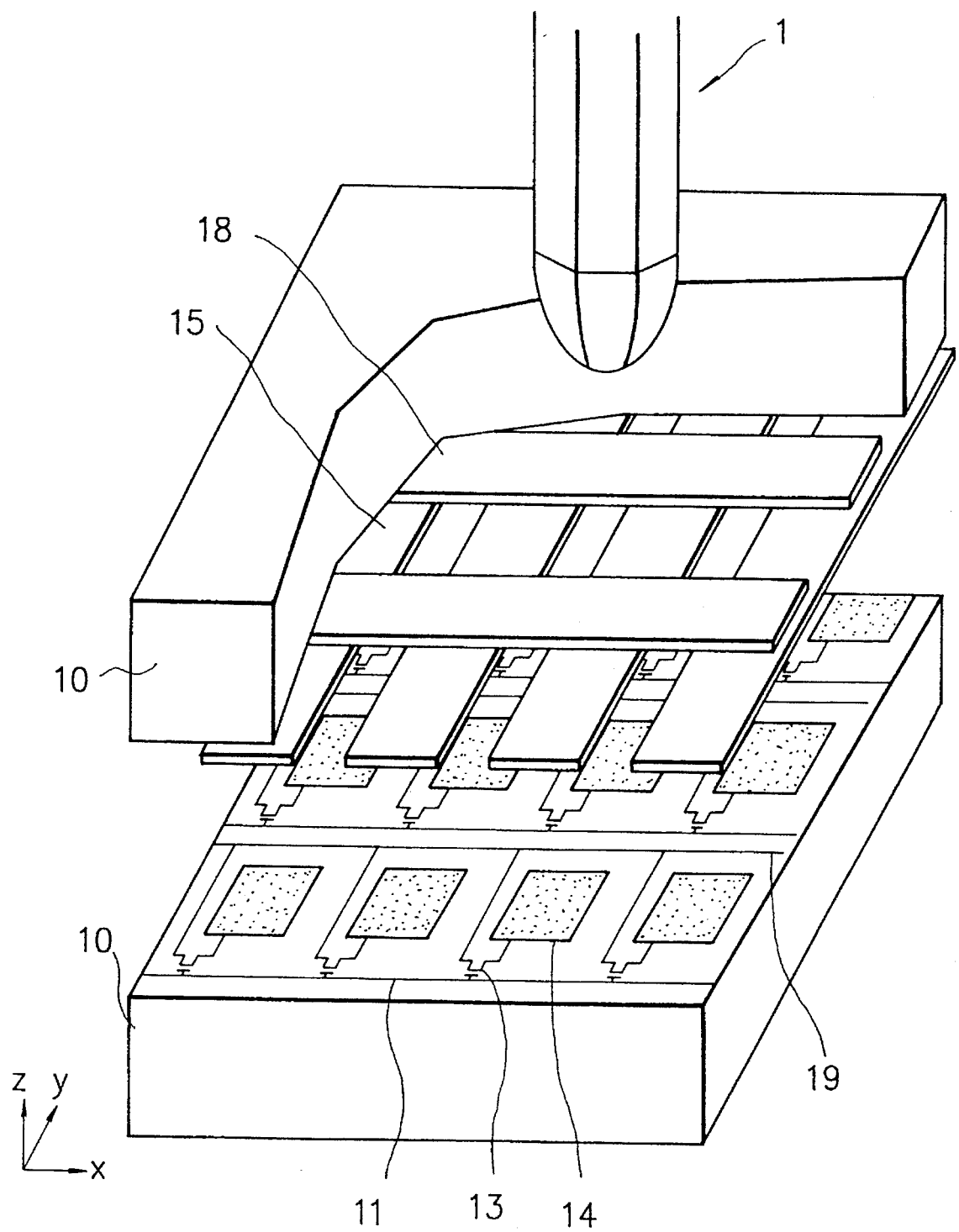
FIG. 6 is a perspective view schematically showing an active matrix liquid crystal display (AMLCD) having an integral pen input function in a fourth embodiment in accordance with the present invention.

FIG. 6 shows in a perspective view a fourth embodiment of the liquid crystal display in accordance with the present invention. This includes an AMLCD configuration known as a non-crossover busses (NCB) structure to which there are added band-shaped electrodes 18 to input pen coordinates with respect to one direction. That is, the configuration includes an upper member and a lower member enclosing therebetween a liquid crystal layer having a thickness of several micrometers. As shown in this diagram, the lower member includes an insulating substrate 10 on which there are formed pixel electrodes 14, TFTs 13, scan lines 11, and reference voltage lines 19 to be kept at a fixed potential. The upper member includes another insulating substrate 10 and two band-shaped electrodes 15 and 18 vertical to each other formed over the substrate 10, the electrodes 15 and 18 each being manufactured with a transparent conductive substance. In this structure, the electrodes 15 are arranged, when viewed from above, to cover the areas of the pixel electrodes 14.

Operation of the fourth embodiment will be next described. The liquid crystal is driven in the same fashion as for the AMLCD of the NCB constitution. That is, setting a potential to be written in pixels to the electrodes related to the pixels, a voltage is sequentially applied to the pixel electrodes 14 to be addressed by the scan lines 11. The pen input operation is driven by applying voltage pulses to the electrodes 15 and 18 so as to obtain x-axis and y-axis coordinates according to the principle of the electrostatic capacitive-coupling scheme. Consequently, the electrodes 15 carry out a function as data electrodes for the liquid crystal display and a function as electrodes to input a coordinate value of the pen associated with a direction.

According to this construction, since the potential change of each electrode 15 is used to accomplish the pen input operation, in order to effect the input operation without exercising influences upon the liquid crystal display, it is required to subdivide a display period of one image into two portions including a liquid crystal display period and a pen coordinate sense period, the former being sufficiently longer in time than the latter. In consequence, the user can input coordinates of only one pen position for each frame.

As described above, in the active matrix liquid crystal display (AMLCD) including an integrated pen input function in accordance with the present invention, there are arranged two sets of electrodes which are vertical with each lo other and which are required to conduct the pen input operation in the electrostatic capacitive-coupling scheme. Consequently, the pen input function can be added to the AMLCD without deteriorating or sacrificing the display performance. The electrodes also serve as constituent elements of the inherent AMLCD and hence lead to an advantage of reduction of the production cost thereof.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An active matrix liquid crystal display, comprising:
a substrate on an active element side including a first insulating substrate, switching elements, pixel electrodes, and scan lines and data lines for writing data in the pixels, the switching elements, the pixel electrodes, and the scan and data lines being formed on the first insulating substrate;
a second insulating substrate on an opposing electrode side, said second insulating substrate including a transparent conductive layer;
a liquid crystal layer enclosed between the substrate on the active element side and the second insulating substrate on the opposing electrode side;
a plurality of first and second electrodes, said first and second electrodes being vertical to each other on the second insulating substrate on the opposing electrode side;
an insulating layer inserted between the first and second electrodes;
means for externally controlling the potential of each of the first and second electrodes in an independent manner;
means for sensing electric charge generated by the first and second electrodes; and
a transparent conductive layer formed under the first and second electrodes, wherein the first and second electrodes are formed with a conductive substance having a light interrupting characteristic; and
wherein the first and second electrodes are arranged in locations opposing areas occupied by gaps between the pixel electrodes and the switching elements on the first substrate on the active element side.

2. A display as claimed in claim 1, wherein the first and second electrodes are formed on the second insulating substrate on the opposing electrode side and include two sets of a multiplicity of band-shaped electrodes, the respective sets being vertical to each other, at least one of the sets of band-shaped electrodes being formed with a transparent conductive material and being arranged in locations opposing the pixel electrodes.

3. An active matrix liquid crystal display, comprising:
a substrate on an active element side including a first insulating substrate, switching elements, pixel electrodes, and scan lines and data lines for writing data in the pixels, the switching elements, the pixel electrodes, and the scan and data lines being formed on the first insulating substrate;
a second insulating substrate on an opposing electrode side, the second insulating substrate including a transparent conductive layer;
a liquid crystal layer enclosed between the substrate on the active element side and the second insulating substrate on the opposing electrode side;
a plurality of electrodes formed between the first insulating substrate of the substrate on the active element side and the pixel electrodes;
an insulating layer inserted between the plurality of electrodes and the pixel electrodes;
means for externally controlling the potential of each of the plural electrodes in an independent manner; and
means for sensing electric charge generated by the plurality of electrodes.

4. A display as claimed in claim 3, wherein the plurality of electrodes are band-shaped, are vertical the scan lines, and are formed with a transparent conductive substance between the first insulating substrate of the substrate on the active element side and the pixel electrodes.

5. An active matrix liquid crystal display in a non-crossover bus (NCB) configuration, comprising:
a first substrate on an active element side including a first insulating substrate, switching elements, pixel electrodes, scan lines, and metal lines for receiving a reference voltage, the switching elements, the pixel electrodes, the scan lines, and the metal lines being formed on the first insulating substrate;
a second substrate on an opposing electrode side including a second insulating substrate and data lines for writing data in the pixels, the data lines being formed on the second insulating substrate;
a liquid crystal layer enclosed between the substrate on the active element side and the second insulating substrate on the opposing electrode side;
a plurality of band-shaped electrodes formed to be vertical to the data lines between the second insulating substrate on the opposing electrode side and the data lines;
an insulating layer inserted between the plurality of electrodes and the data lines;
means for externally controlling the potential of each of the band-shaped electrodes in an independent manner; and
means for sensing electric charge generated by the plurality of band-shaped electrodes and the data lines.

* * * * *